Nov. 8, 1966    R. S. SOLOFF ETAL    3,284,257
METHOD OF BONDING NON-THERMOPLASTIC PARTS BY SONIC ENERGY
Filed Aug. 6, 1965    2 Sheets-Sheet 1
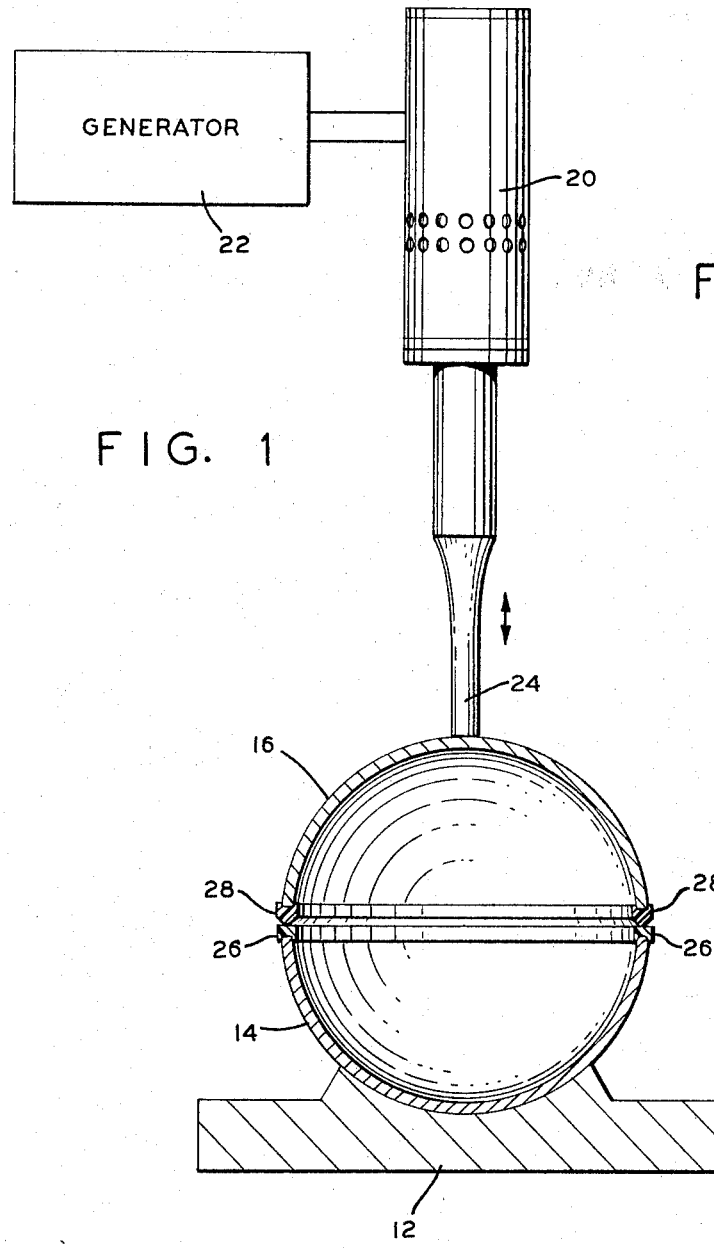
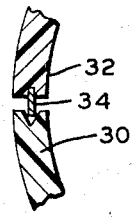
INVENTORS.
ROBERT S. SOLOFF
SEYMOUR G. LINSLEY
BY Ervin B. Steinberg
AGENT.

Nov. 8, 1966  R. S. SOLOFF ETAL  3,284,257
METHOD OF BONDING NON-THERMOPLASTIC PARTS BY SONIC ENERGY
Filed Aug. 6, 1965  2 Sheets-Sheet 2

INVENTORS.
ROBERT S. SOLOFF
SEYMOUR G. LINSLEY
BY
Ervin B. Steinberg
AGENT.

United States Patent Office

3,284,257
Patented Nov. 8, 1966

3,284,257
METHOD OF BONDING NON-THERMOPLASTIC
PARTS BY SONIC ENERGY
Robert S. Soloff, Stamford, and Seymour G. Linsley, Bridgeport, Conn., assignors to Branson Instruments, Incorporated, Stamford, Conn., a corporation of Delaware
Filed Aug. 6, 1965, Ser. No. 477,758
4 Claims. (Cl. 156—73)

This application is a continuation-in-part application of the copending application for U.S. Letters Patent Serial No. 328,500, filed December 6, 1963 in the name of Robert S. Soloff, et al., entitled "Sonic Method of Welding Thermoplastic Parts," which application is assigned to the same assignee, now U.S. Patent No. 3,224,916 dated December 21, 1965.

In the application identified hereinabove, there is described a method of joining rigid and semi-rigid surfaces and parts by the use of sonic energy. This method is particularly suited for thermoplastic parts where dissipated sonic energy is employed to soften and to melt the thermoplastic material at an interface along which the parts are to be joined, thereby producing a fusion joint.

As described more specifically in the patent application supra, rigid or semi-rigid thermoplastic parts may be sealed to each other by pressing the parts into intimate contact at an interface where it is desired to achieve a weld and, thereafter, to introduce sonic energy into one of the parts at an area of that part remote from any and all of the desired welding interfaces. By so doing, the sonic energy is conducted by such part from the point of energy application to the interface with the other part, the dissipated energy causing a softening of the thermoplastic material thereat and thus, providing a joint.

It will be apparent that, in order to practice this method of obtaining a bond by sonic energy, it is not necessary that the entire part or parts be fabricated from thermoplastic material, but that it will suffice to provide an interface of thermoplastic material or, in a more general sense, a material which is activatable by the dissipation of thermal energy. Hence, it is possible, for example, to provide metal parts with a thermally activatable interface, to hold such parts in intimate contact along such an interface, and to apply sonic energy to one of the parts at an area remote from the interface. The sonic energy is transmitted then by such part to the common interface and the energy dissipated thereat activates the interface material to provide a bond between the two parts. Similar results are achieved with bonding metal parts to glass, bonding thermosetting parts to one another, or for obtaining a bond between materials which have widely different physical or chemical properties.

It is evident, therefore, that the method of the present invention permits the sealing of parts which are not necessarily formed entirely of thermoplastic material, but that a bond may be provided between materials of a much greater variety.

The sealing and bonding by sonic energy is a dry method, that is, it requires no liquids for softening or activating the material at the bonding surface. Moreover, it is for all practical purposes a cold method. Although some heat is developed, such heating is confined to the immediate area of the sealing interface. Hence, the sonic method of sealing and bonding is characterized by many advantages not found with the previously known methods.

One of the principal objects of this invention is, therefore, the provision of a method for bonding surfaces to one another by the use of sonic energy.

Another object of this invention is the provision of a method and arrangement for bonding surfaces to one another by the use of sonic energy, using an interface material which is adapted to be thermally activated by sonic energy and which material upon such activation provides a bond between the surfaces to be joined.

A further object of this invention is the provision of a method for joining by sonic energy a wide variety of surfaces and parts which ordinarily are not joinable by means of sonic energy.

A further and other object of this invention is the provision of a method for bonding flexible, semi-rigid and relatively stiff surfaces and parts by means of sonic energy, using an interposed bonding material which is adapted to be activated by sonic energy.

Further and still other objects of this invention will become more readily apparent by reference to the following description when taken in conjunction with the accompanying drawings in which:

FIGURE 1 is a vertical view, partly in cross section, of a typical arrangement for welding two hemispheres by sonic energy;

FIGURE 2 is an enlarged portion of an alternative bonding method which may be used in connection with FIGURE 1;

Figure 3:
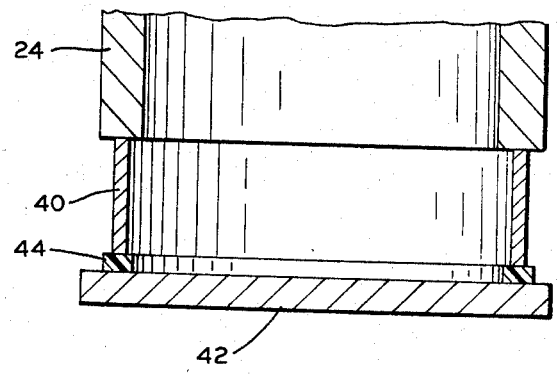
FIGURE 3 is a vertical view of another typical embodiment of the present invention.

Referring now to the figures and FIGURE 1 in particular, there is shown a fixture 12 which supports a lower hemisphere 14 and an abutting upper hemisphere 16. The upper hemisphere 16 is contacted by a horn 24 coupled to a sonic energy converter 20 which is energized with electrical high frequency energy from a generator 22. The electrical energy from the generator 22 is converted by the sonic converter 20 to sonic energy in the form of mechanical oscillations, causing the horn 24 to vibrate along its longitudinal axis. The horn 24, as shown in FIGURE 1, contacts the surface of the upper hemisphere 16 and transfers sonic energy thereto. This energy is conducted by the upper hemisphere to its interface with the lower hemisphere 14, thereby causing a fusion joint or weld, provided that both parts are made of suitable material, such as thermoplastic material described in the above identified patent application. The weld occurs due to the dissipation of energy, i.e. the frictional heat caused by the relative motion of the parts softens the interface and causes the softened material portions to be worked into each other.

As is shown in FIGURE 1, the lower hemisphere 14 and the upper hemisphere 16 may be made of material other than thermoplastic, such as aluminum, and each hemisphere is provided with an annular ring of thermoplastic material, numerals 26 and 28. Each ring is joined securely to the respective hemisphere. Therefore, the energy from the converter 20 is transmitted via the hemispherical part 16 to the thermoplastic sealing surfaces, where the sonic energy is dissipated, the resulting heat losses causing a softening and fusing of the thermoplastic material. It is believed that the repetitive pressure waves acting upon the sealing surfaces aid in providing the intimate seal which has been observed.

The sonic energy source, in the typical application, is a piezoelectric converter which provides sonic energy at approximately 20 kilocycles per second and 150 watts of power. This unit is available as Model J–17 from the Branson Sonic Power Division of Branson Instruments, Inc., Danbury, Connecticut, and is the same unit which is described for sealing thermoplastic parts and surfaces in the patent application identified heretofore.

The sonic converter preferably is mounted in a pneumatically actuated stand for urging both surfaces to be joined into intimate contact and while in such intimate contact, the generator 22 is energized to cause the sonic energy to reach the sealing surfaces 26 and 28 where the dissipated energy activates the interfaces, resulting in a softening and flowing of such material. Upon interrupting the sonic energy, the softened material immediately hardens and a proper joint is obtained in a matter of a second or two. Alternatively, the converter 20 may be supported by hand and urged in the direction toward the fixture 12. While the frequency of the sonic energy is not critical, most commercially available units operate at a frequency above 16 kilocycles per second, the inaudible frequency range. However, sonic energy within the audible or inaudible frequency range may be used without departing from the concept of this invention. The sealing process is particularly successful when the sonic energy is introduced at an area of the hemisphere 16 which is substantially greater than the total area of intimate contact of the hemispheres 14 and 16 along the sealing surfaces 26 and 28. The sealing surfaces may follow the configuration described in the article "How to Get Good Ultrasonic Welds" by E. Obeda, Modern Plastics magazine, November 1964.

A modified design, using a bonding technique, is shown in FIGURE 2, wherein a single thermally activatable annular, gasket-like ring 34 is interposed between the hemispheric part 30 and the opposing hemispheric part 32 to bond both parts together. The hemispheric parts 30 and 32 may comprise, for instance, a thermosetting material, e.g. Bakelite, which ordinarily would not bond to itself, and the ring 34 may comprise a polyamide thermoplastic material, such as the material available under the trademark "Versalon" from the General Mills Chemical Division, Buffalo, New York. Upon providing sonic energy to the joint, the thermoplastic material 34 softens, flows and bonds the parts 30 and 32 to each other.

FIGURE 3 shows a similar embodiment wherein a cylindrical part 40 is bonded to a plate 42 using an interposed bonding material 44 which is thermally activated by sonic energy, such energy being provided by a cylindrical horn 24 contacting the cylinder 40. The plate 42 and the cylinder 40 may be of any suitable material, requiring merely that the cylinder 40 be capable of transmitting sonic energy to the bonding layer 44. The part 40 and the part 42 may be metal, glass, thermoplastic or thermosetting materials, while the interposed bonding material 44 is preferably a thermoplastic material readily activated by the dissipation of sonic energy, but, interestingly enough, experiments have shown that for instance an interposed surface of a partially cured epoxy material, such as the material of the Shell Chemical Company, New York, N.Y. available under the trademark Epon 927, will provide good bonding. The dissipated sonic energy appears to cure such thermosetting film material. Using either thermoplastic or thermosetting sonically activatable bonding material, it has been possible to bond metal surfaces and parts to metal surfaces, aluminum and galvanized steel to each other, metal to glass, and thermoplastic parts to thermosetting parts, e.g. nylon to Bakelite. Also, thermoplastic materials which have widely different softening temperatures can readily be bonded to one another by interposing a bonding material which has a relatively lower softening temperature and wets the opposing surfaces.

Figure 4:
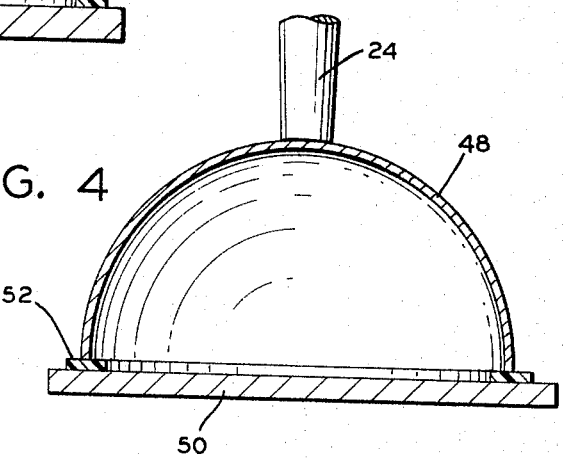
FIGURE 4 is a further embodiment of the present invention.

FIGURE 4 shows an example wherein a rigid or semirigid hemisphere 48 is bonded to a plate 50 using a bonding interface material 52. The parts 48, 50, and 52 may comprise any of the typical materials mentioned heretofore. Additionally, the parts 48 and 50 may comprise thermoplastic materials which are relatively difficult to join by sonic energy e.g. nylon. This type of material, because of its extremely low coefficient of friction, has proven difficult to join by sonic energy as apparently an insufficient amount of frictional heat is developed at the interface. When interposing one of the more readily thermally activatable bonding materials of the type described heretofore, including rubber base adhesives, it has been possible to join such parts to one another without encountering the usual difficulties.

Figure 5:
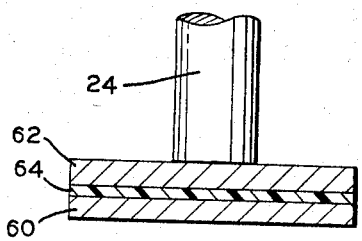
FIGURE 5 is a view of still another alternative example of the present method.

FIGURE 5 shows the laminating of flat strips 60 and 62 by interposing a layer of bonding material 64. The energy for activating the bonding material 64 is provided by the converter 22 via the horn 24 which transfers the sonic energy to the upper strip 62.

Figure 6:
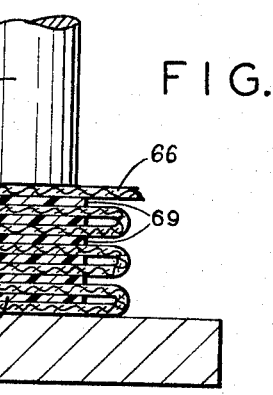
FIGURE 6 illustrates a still further example of the present invention.

FIGURE 6 illustrates a zig-zag folded material 66 which is supported on a stationary base 68, the latter serving as an anvil. In each fold there is disposed a thermally activatable bonding material 69 which is activated by the sonic energy transferred thereto from the vibrating horn 24. As the horn vibrates, it also compresses the assembly. The material 66 may be of any suitable composition, including limp textile material, synthetic fiber or otherwise, e.g. woven glass fiber. The sonic energy activates the bonding material to cause a bond between the juxtaposed folds. Instead of the interposed bonding material 69 being a solid material, it may comprise also a fine surface film which is applied directly to the material 66. In this way, it is possible to provide permanent pleats in draperies, curtains, and the like.

While in a rather substantial number of cases the dissipation of sonic energy is sufficient to activate the bonding material, and thereby obtain a bond, there are instances when the additional use of heat provides improved bonding strength. Therefore, the combinations of sonic energy applied to a thermally activatable bonding material combined with a subsequent heating of the surfaces at which bonding occurs, shall be specifically included in this disclosure. For instance, in bonding Bakelite to galvanized steel using "Epon 927" film adhesive, sonic energy applied to a specific example for eight seconds showed a shear strength of 500 pounds per square inch. Subsequent heating to 180 degrees F. increased the bond strength to 950 pounds per square inch.

From the foregoing examples and description it will be apparent that sonic energy may be used for sealing and bonding an almost unlimited variety of materials with utmost convenience and facility. Moreover, the disclosed sealing and bonding process is clean, convenient and extremely fast, thereby consituting a major advance in the art.

For material disclosed herein but not claimed, reference is made to copending application for U.S. Letters Patent, Serial No. 477,759 filed August 6, 1965.

While there has been described and illustrated a preferred embodiment of the present invention and several variations thereof, it will be apparent to those skilled in the art that further changes and modifications may be made therein without departing from the broad principle and intent of this invention, which shall be limited only by the scope of the appended claims.

What is claimed is:

1. The method of fusion welding relatively stiff non-thermoplastic parts which are provided with thermoplastic sealing surfaces, comprising the steps of:
    (a) holding at least two of said parts in intimate contact along such sealing surfaces and,
    (b) introducing sonic energy into a surface of at least one of the parts over an area substantially greater than the total area of intimate contact of said parts along said sealing surfaces to thereby effect a fusion weld between the parts.

2. The method of fusion welding a relatively stiff non-thermoplastic workpiece having thermoplastic sealing surfaces, comprising the steps of:

(a) holding said thermoplastic sealing surfaces of the workpiece to be welded in intimate abutting contact;
(b) introducing sonic power into the workpiece at a position remote from said sealing surfaces, said power being transmitted along a path through the workpiece substantially departing from a straight line to cause relative vibratory motion at said sealing surfaces to produce frictional heating of said surfaces and thereby effect a fusion weld.

3. The method of fusion welding relatively stiff nonthermoplastic workpieces, each of said workpieces having thermoplastic sealing surfaces, comprising the steps of:
(a) holding said thermoplastic sealing surfaces of a said workpiece to be welded in intimate abutting contact;
(b) introducing sonic power into the workpiece along an axis offset from said sealing surfaces, said power being transmitted through the workpiece away from said axis along a path substantially departing from a straight line to cause relative vibratory motion at said abutting surfaces to produce frictional heating of said sealing surfaces and thereby effect a fusion weld.

4. The method of fusion welding relatively stiff non-thermoplastic workpieces, each such workpiece having a plurality of thermoplastic sealing surfaces, comprising the steps of:
(a) holding at least two of said thermoplastic sealing surfaces of a said workpiece to be welded in intimate abutting contact;
(b) introducing sonic power into the workpiece at an exposed surface thereof remote from the abutting surfaces thereof and along an axis offset from said abutting surfaces, said power being transmitted through the workpiece along paths substantially departing from a straight line to cause relative vibratory motion at said abutting sealing surfaces to produce frictional heating at said surfaces and thereby effect a fusion weld.

References Cited by the Examiner
UNITED STATES PATENTS 2,522,082 9/1950 Arnold _____ 156—73 XR
3,022,814 2/1962 Bodine _____ 156—73

EARL M. BERGERT, *Primary Examiner.*

P. DIER, *Assistant Examiner.*